United States Patent Office 3,538,310
Patented Nov. 3, 1970

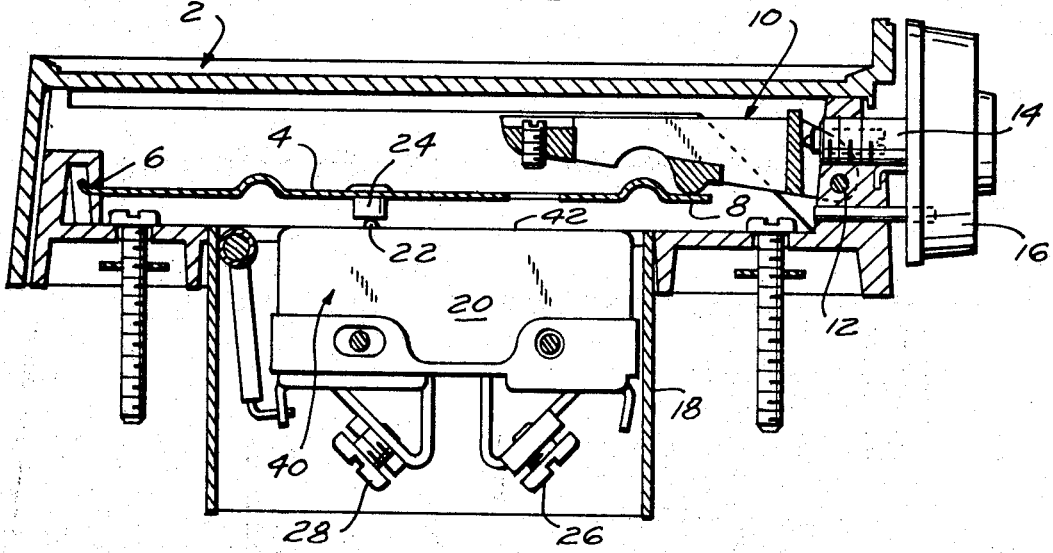

3,538,310
DROOP-PREVENTION IN THERMOSTAT-CONTROLLED SWITCHING SYSTEM
Joseph K. Moyer and Robert N. Levinn, Catskill, N.Y., assignors to American Thermostat Corporation, South Cairo, N.Y., a corporation of New York
Filed May 16, 1967, Ser. No. 638,919
Int. Cl. H05b 1/02
U.S. Cl. 219—511
16 Claims

ABSTRACT OF THE DISCLOSURE

In a system comprising a temperature-sensing means designed to be exposed to an external temperature condition and to actuate a switch or other current-control means in accordance therewith, and in which the switch is in thermal transfer relation to the temperature-sensing means so that the heat developed by said switch will affect the operation of the temperature sensing means, thereby tending to cause it to operate at different values of external temperature depending upon the degree to which heat is produced in the switch; a temperature-controlled heater is operatively associated with the switch so as to maintain the latter at a predetermined elevated temperature, thereby to cause the thermal effect of the switch on the temperature-sensing means to be substantially constant over a given range of operating conditions.

---

The present invention relates to a thermostat-controlled switching system, and is specifically related to means for increasing the accuracy of temperature-maintenance achieved by that system. It also relates to a switch assembly specially designed for use in such a system.

In thermostat-controlled heating systems, and particularly those employed for space heating, where electrically energized or controlled heating means are provided, the electrical circuit for energizing or controlling that heating means includes means, usually a switch, for controlling the current applied. Temperature-sensing means such as a wall-mounted thermostat is appropriately positioned within the space to be heated so as to be exposed to the temperature thereof, and this temperature sensing means is operatively connected to the current control means so as to actuate the latter in accordance with the sensed temperature of the space to be heated. Usually the thermostat is adjustable so that the temperature of the space in question can be set at any desired value within limits, either to suit the personal predilection of the person involved or for any other purpose.

It has been found that in existing installations the temperature setting of the thermostat bears only an indirect relationship to the actual temperature of the space being heated and, indeed, the relationship between the setting of the thermostat and the actual temperature of the room will vary depending upon the degree to which heating is required. For example, in one test which has been carried out under controlled conditions a thermostat setting of 75° F. produced average room temperatures of 73° F., 68.5° F. and 64° F. under three different conditions of loading corresponding to temperatures outside the room of 60° F., 40° F. and 20° F. respectively. Such variation of temperature in the heated space with change in overall load is called "droop." It is an undesirable, little appreciated and even less understood phenomenon.

One of the major reasons, if not the sole reason, why droop occurs is the thermal feedback action of the switch on the thermostat which actuates it. The thermostat is exposed to the temperature of the space to be heated, and if that were the only effect thereon there would be no droop. However, the current that passes through the switch creates heat and raises the switch temperature. The switch radiates heat, and since the switch is in thermal connection with the temperature sensing means, the temperature of the switch and the heat radiated therefrom will affect the temperature sensing means and will cause the latter to respond to that heat as well as to the temperature of the room being heated. When the room needs little heating the switch is closed only a small proportion of the time and hence only a small amount of heat is created therein. As the outside temperature falls and the room requires more and more heating, the switch will remain closed for a longer proportion of the time, current will flow therethrough for a longer time, more heat will be produced therein, the temperature of the switch will rise, and hence the temperature sensing means will be affected by the heat from the switch to a greater degree than when only a small amount of heating was required. The more the temperature sensing means is affected by the switch, the lower will be the room temperature necessary to actuate the temperature sensing means. Hence the colder the day the longer the heaters will be energized and the colder will be the room, assuming that the thermostat adjustment remains the same.

Studies have been made of this problem. One of them is summarized in a paper entitled "Test Room Performance of Line-Voltage Thermostats" by R. C. Cape and R. H. Tull, which report is based on a series of tests made in a specially designed environmental test room of the Electric Space Conditioning Institute. The existence of droop to as much as 15° F. was noted, the cause of the droop was correctly analyzed as outlined above, and the authors concluded that droop may be improved in one or more of the following ways:

(1) Reduce the total amount of internal heating.
(2) Better thermal isolation of the sensing element from the extraneous internal heat sources.
(3) Better heat transfer between the internal heat sources and the surround.
(4) Better thermal response of the sensing element to room air temperatures.

These suggested approaches are either impractical, incomplete, or would require such extensive redesign of the thermostat assemblies and the manner in which they are mounted in the room as to constitute a major engineering and esthetic problem. For example, to provide thermal isolation of the sensing element from the switch (extraneous internal heat source) would greatly add to the cost and bulkiness of the overall assembly, to provide better heat transfer to the surround would involve more conspicuously mounting the thermostat in the room, which is esthetically contraindicated, and it is by no means obvious how the total amount of internal heating can be reduced or the sensing element can be given a better thermal response to room air temperature.

We have devised a system which will substantially eliminate droop, which will not involve any significant redesign in the thermostat assemblies per se, but only in the switch components thereof, and which can be very readily and comparatively inexpensively accomplished through the use of existing circuit and control components the manner of use and reliability of which are well known.

In accordance with our invention the total amount of internal heating is not minimized, as suggested by the aforementioned report, but is instead made constant, and preferably maximized. In other words, instead of trying to keep the temperature of the switch as low as possible and fighting the heat produced in the switch when it is conductive, we propose to accept the heat produced in the switch under maximum load conditions and to ensure that the same amount of heat is produced in that switch whether the load conditions are maximum, minimum, or any place inbetween. To that end we incorporate into the switch, or we associate with the switch in direct primary thermal relation thereto, a supplementary heater which is controlled by its own temperature sensing means, that means being adjusted so as to cause the temperature of the switch to remain at that value which it would assume under high, and preferably maximum, operating load conditions. When no space heating is called for this switch heater will be active to a maximum degree. As the space heating system is called upon to heat to a greater and greater degree the switch will be conductive for greater and greater proportions of the time, more heat will be produced by the switch itself, and the switch heater will be correspondingly reduced in energization, to the end that the total amount of heat produced will maintain the switch temperature at a predetermined value. Since under these circumstances the temperature sensing means exposed to the space to be heated will always be affected to the same degree by the heat emanating from the switch, its sensitivity to changes in the temperature of the external space being heated will remain constant whether the heating load is great or small, and hence the temperature of that space will remain constant. Tests carried out under conditions comparable to those described in the above mentioned paper where droop of as much as 15° F. was reported, but in accordance with the present invention, showed a droop of no more than 2° F., an improvement of better than seven-fold.

Normal electrical engineering teachings suggest that the temperatures of switches, like the temperatures of other electrical devices, should be maintained as low as possible. The teachings of the present invention to the effect that the switch temperature should be maintained at an elevated temperature, and preferably at one corresponding to the maximum temperature which the switch will attain during normal operating conditions, will therefore be recognized as quite unusual.

The use of a heated switch, one the temperature of which is maintained at an elevated value, has a corollary advantage over the conventional use of a low-temperature switch. It promotes the flow of air from the space to be heated over the primary temperature sensing means by producing a "chimney" effect, and thus gives rise to a greater sensitivity on the part of that temperature sensing means to the temperature of the space being heated, both absolutely and with regard to time of response, even apart from the uniformity of the thermal feedback action thereon derived from the switch.

It will be understood, of course, that the temperature at which the switch is maintained, while elevated, is nevertheless at a value safe for the operation of that switch and all associated electrical components.

To the accomplishment of the above, and to such other objects as may hereinafter appear, the present invention relates to a droop-preventing thermostat system and to a switch assembly specially designed for use therein, all as defined in the appended claims and as described in this specification, taken together with the accompanying drawing, in which:

FIG. 1 is a cross sectional view of one construction of a wall thermostat-switch assembly suitable for use in connection with the present invention;

FIG. 2 is a schematic view of one embodiment of the present invention, the temperature sensing means and its operative connection to the switch corresponding to what is disclosed in FIG. 1;

Figure 3:
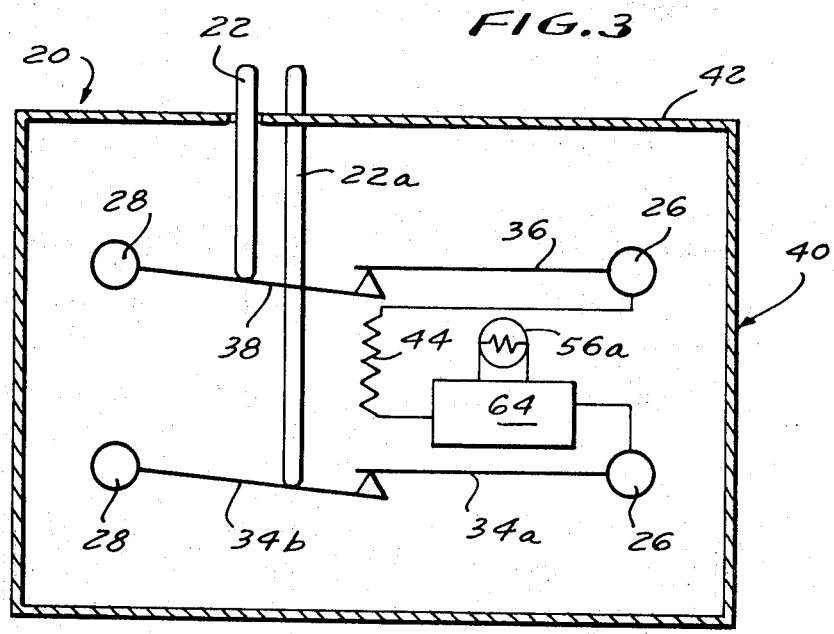
FIG. 3 is a schematic view of the switch assembly portion of an alternative embodiment of the present invention.

It may be mentioned at the outset that the specific thermostat assembly structure shown in FIG. 1 is itself the subject matter of a copending application Ser. No. 643,680 now Pat. No. 3,421,131, filed June 5, 1967 in the name of Joseph K. Moyer et al., entitled Thermostat Assembly and assigned to the assignee of this invention. It must further be emphasized that the details of the thermostat assembly of FIG. 1 form no part of the present invention, and are here set forth for exemplification purposes only. Those details, as well as many of the details of the switch constructions, except as hereinafter set forth, may be widely varied without departing from the present invention.

The thermostat assembly of FIG. 1 is adapted to be mounted on the wall of a room to be heated. It comprises a housing 2 which extends out from the wall into the room space through which room air is adapted to circulate. Within the housing 2 is a temperature sensing means 4 in the form of a bimetal strip or sheet, one end 6 of which is substantially fixedly mounted and the other end 8 of which is adapted to be engaged by an adjusting means generally designated 10 and comprising a lever pivoted at 12 and acted upon by a screw 14 to which an adjustment knob 16 is secured. Depending from the housing 2, and adapted to extend into the wall on which the thermostat assembly is mounted, is a shell 18 within which one or more current control assemblies generally designated 20 are received. These current control assemblies, in the form here disclosed by way of exemplification, are of the snap-switch type, having a button 22 resiliently urged upwardly therefrom to correspond to one switch condition e.g. conductive) and movable downwardly to actuate the switch to the opposite switch condition (e.g. non-conductive). The bimetal 4 carries a stud 24 which engages the switch button 22 and, in accordance with the temperature-induced bending of the temperature sensing means 4, actuates the switch 20 between its conductive and non-conductive conditions. The switch 20 is provided with a pair of input terminals 26 and a pair of output terminals 28, with an external power source 30 being adapted to be connected to the input terminals 26 and with an external electric circuit including a heater 32 adapted to be connected to the output terminals 28, as indicated in FIG. 2. The heater 32 is the one adapted to heat the room or other space to which the temperature sensing means 4 is thermally exposed.

In the switch embodiment disclosed in FIG. 2 a lead 34 conductively connects one pair of input and output terminals 26, 28. Between the other pair of input and output terminals 26 and 28 is a substantially fixed conductive member 36 and a movable conductive member 38, the latter being moved by the button 22 between an upper position shonw in FIG. 2, in which it engages the member 36 and thus closes the circuit through the switch, and a position disposed below that shown in FIG. 2, in which it is separated from the member 36 and therefore opens the circuit through the switch 20. When the circuit through the switch 20 is closed the heater 32 will be energized, and when the circuit through the switch 20 is open the heater 32 will be de-energized. All of the above (except for some details of the specific structure of the embodiment disclosed in FIG. 1) are essentially common to space heating and other thermostat systems, and it will be apparent that many variations may be made therein. Just as one example, the current control means 20 operatively connected to the heater 32 is shown as a mechanical switch actuatable only to open and closed positions, but any other suitable current control means could be employed, such an an electronic switch or mechanical or electronic means for varying the current flow either gradually or in discrete steps from any given maximum value to any given minimum value.

The switching mechanism is enclosed within a housing generally designated 40 having a top wall 42 which separates it from the temperature-sensing means 4. In accordance with the present invention, and as disclosed in FIG. 2, there is located within the housing 40 an auxiliary heater 44 one end of which is electrically connected by lead 46 to one input terminal 26. The other end of heater 44 is connected to conductive bar 50 which is in turn adapted to make electrical connection with contact 52 connected by lead 54 to the other input terminal 26. A second temperature sensing means 56 is located within the housing 40 and may be constituted by a bimetal strip, and it may be operatively connected, as indicated by the line 58, to the movable contact 52, so that the position of the latter relative to the bar 50 is determined by the temperature sensing means 56. The limiting lower position of the bar 50 may be adjusted by positive stop 60 the position of which may be adjusted as indicated schematically by the control knob 62. The assembly 50, 52, 56, 60 and associated parts will be recognized as a schematic showing of a temperature-sensitive switch, the details of which may be varied widely, all as is well known in the art. The temperature sensing means 56 is sensitive to the temperature of the current control means 20, and controls the energization of the heater 44 so as to maintain that temperature at a constant value determined by the setting of the knob 62.

In the preferred practice of the present invention, the heating system such as is shown in FIG. 2, but with the auxiliary heater 44 disconnected, is operated under conditions of maximum electrical demand (maximum heating requirements), and as a result the current control means 20 is rendered conductive for a maximum proportion of the time. The maximum temperature which the current control means 20 attains under these circumstances is determined. In a typical installation it may be 135° F. The auxiliary heater 44 is then connected, the temperature-sensing means 56 is set so as to cause the temperature within the housing 40 to remain at that maximum temperature value, such as 135° F. Under conditions of no demand (no heating) that temperature would be maintained entirely by the heater 44, with the temperature sensing means 56 cycling that heater, if necessary, to maintain that temperature. Under conditions of maximum demand (maximum heating) all or practically all of the heat required to maintain the interior of the housing 40 at the predetermined temperature would be produced by the current flowing through the housing, and hence the heater 44 would supply little if any heat. Under intermediate conditions of demand (medium heating) an intermediate situation would exist, with some of the heat being provided by the heater 44 and some by the current flowing through the housing 40. Under all demand conditions the temperature of the space within the housing 40 will remain substantially constant, the heat radiated from wall 42 to the temperature sensing means 4 will be constant, and hence the temperature sensing means 4 will be variably affected only by the air in the space being heated by the main heater 32, which is precisely the ideal "no droop" condition which it is desired to attain.

In FIG. 2 energization of the heater 44 is accomplished by means of a bimetal control. In FIG. 3 a system is disclosed in which the heater 44 is variably energized by means of an appropriate solid state electronic circuit generally designated 64, many detailed variations of which are known in the art, the action of this solid state circuit 64 being controlled by the temperature sensing means 56a, which may be in the form of a thermistor, a device the electrical resistance of which varies in accordance with the temperature sensed thereby. It will be understood that the control circuitry 64, although specifically disclosed located within the housing 40, could be externally located provided that appropriate electrical connections are made.

In addition, in FIG. 3, the lower pair of input and output terminals 26, 28, instead of being connected by the lead 34 of FIG. 2, are instead connected by resiliently acting switch elements 34a and 34b which are normally engaged with one another but which may be moved into disengaged or open-circuit position by means of a second plunger 22a which extends up from the housing 40 and which may be appropriately externally actuated, as by the bimetal strip 4. This, it will be recognized, is the so-called line-break switch called for in those specifications where the opening of the circuits to both sides of the external heater is required. This arrangement could, of course, be used also in the embodiment of FIG. 2 if desired.

Figure 4:
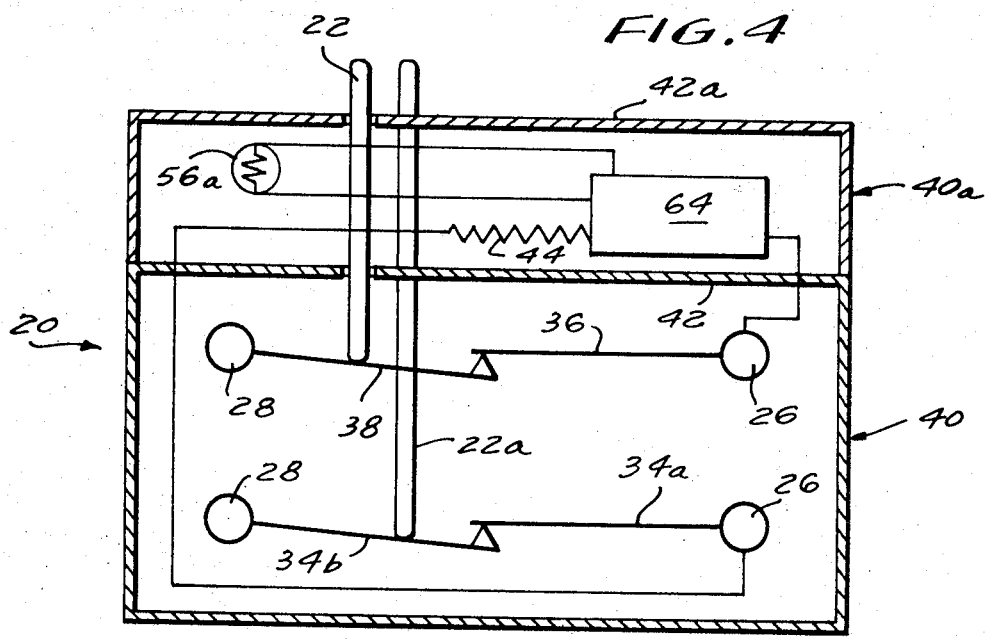
FIG. 4 is a schematic view of yet another alternative embodiment of the switch assembly used in connection with the present invention.

In the embodiments of FIGS. 2 and 3 the heater 44 and the temperature sensing means 56 or 56a and the means actuated by the temperature sensing means for controlling the energization of the heater 44 were all located within the housing 40. It is not essential that this be the case, and FIG. 4 therefore illustrates a variant, along the lines of the embodiment of FIG. 3, in which the heater 44, the means controlling the energization thereof (specifically disclosed as the solid state control circuit 64) and the temperature sensing means (specifically disclosed as the thermistor 56a) are all located in a housing 40a positioned on top of the housing 40 and having a top wall 42a which is directed toward the main temperature sensing means 4. This arrangement permits the use of standard existing switch assemblies, which are modified to conform with the present invention merely by the adding thereto of the housing 40a and its contents.

Since the current control means 20 will, in accordance with the present invention, constitute a heat source, it will tend to promote air circulation through the housing 2 by virtue of the so-called chimney effect, and hence a greater amount of air from the space being heated will pass over the temperature sensing means 4 in a given period of time. This will not only make the system more quickly responsive to changes in room temperature but will also provide for a greater static sensitvity as well.

The devices to be added to an existing system in order to cause it to operate in accordance with the present invention are simple and standard. They constitute merely a heater and a temperature-sensitive control therefor. These may readily and inexpensively be built into switch assemblies or added to existing switch assemblies. Indeed, switches thus constituted may well have advantages in other installations, such as those where constant electrical parameters of the switch are desired over a wide range of operating conditions. With the practice of the present invention droop is substantially or completely eliminated and hence the temperature of the room or other controlled space stays constant once the thermostat is set no matter what heating load is required. No longer must thermostats be turned up when the temperature outside gets cold in order to keep the room at a comfortable temperature, as has been the case heretofore. With the present invention, one setting of the thermostat will suffice to produce the same room temperature whether the temperature outside is 60° F. or 0° F.

While but a limited number of embodiments of the present invention have been here specifically disclosed, it will be apparent that many variations may be made therein, all within the spirit of the invention as defined in the following claims.

We claim:

1. The combination of a first temperature-sensing means, current-control means in thermal transfer relation to said temperature-sensing means, an external electric circuit operatively connected to said current-control means so as to be controlled thereby and so that current flows through said current control means with variable degree during operation, thereby to produce heat and to affect the temperature of said current-control means, an operative connection between said first temperature-sensing means and said current control means for actuating the latter in accordance with the temperature-sensing status of the former, means for exposing said first temperature-sensing means to an external temperature condition, a heater in primary thermal transfer relation to said current-control means, means for controllably energizing said heater, and second temperature-sensing means thermally exposed to the temperature of said current-control means, operatively connected to said means for controllably energizing said heater for actuating the latter, and effective to maintain the temperature of said current-controll means substantially at a predetermined temperature.

2. In the combination of claim 1, a wall between said current control means and said heater on the one hand and said first temperature sensing means on the other hand.

3. The combination of claim 2, in which said means for controllably energizing said heater is on the side of said wall opposite from said first temperature-sensing means.

4. The combination of claim 2, in which said second temperature-sensing means and said means for controllably energizing said heater are on the side of said wall opposite from said first temperature-sensing means.

5. In the combination of claim 1, a housing for said first temperature-sensing means, said housing being exposed to said external temperature condition, said current control means being located at least in part beyond said housing.

6. In the combination of claim 1, a housing for said first temperature-sensing means, said housing being exposed to said external temperature condition, said current control means being located at least in part beyond said housing and separated from said housing by a wall.

7. In the combination of claim 1, a housing for said first temperature-sensing means, said housing being exposed to said external temperature condition, said current control means being located at least in part beyond said housing and separated from said housing by a wall, said heater and said current control means being on the side of said wall opposite from said first temperature-sensing means.

8. In the combination of claim 1, a housing for said first temperature-sensing means, said housing being exposed to said external temperature condition, said current control means being located at least in part beyond said housing and separated from said housing by a wall, said heater, said current-control means, said means controllably energizing said heater, and said second temperature-sensing means being on the side of said wall opposite from said first temperature-sensing means.

9. The combination of claim 1, in which said first temperature-sensing means is exposed to an external space to be heated, said external electric circuit comprising a second heater in said space the energization of which, and hence the heating effect of which, is controlled by said current control means.

10. In the combination of claim 9, a wall between said current control means and said heater on the one hand and said first temperature sensing means on the other hand.

11. In the combination of claim 9, a wall between said current control means, said first heater and said means for controllably energizing said first heater on the one hand and said first temperature-sensing means on the other hand.

12. In the combination of claim 9, a housing for said first temperature-sensing means, said housing being exposed to said external temperature condition, said current control means being located at least in part beyond said housing.

13. In the combination of claim 9, a housing for said first temperature-sensing means, said housing being exposed to said external temperature condition, said current control means being located at least in part beyond said housing and separated from said housing by a wall.

14. In the combination of claim 9, a housing for said first temperature-sensing means, said housing being exposed to said external temperature condition, said current control means being located at least in part beyond said housing and separated from said housing by a wall, said heater and said current control means being on the side of said wall opposite from said first temperature-sensing means.

15. A space temperature-controlling system comprising a temperature-modifying means for said space, a current control means operatively connected to said temperature-modifying means for controlling the latter and electrically connected to a current source so that current flows therethrough, thereby producing heat, means for sensing the temperature of said space and correspondingly actuating said current control means, said temperature-sensing means and said current control means being in thermal transfer relation, and means active on said current control means and operative independently of said space-temperature sensing means so as to maintain the temperature of said current control means substantialy constant at a predetermined value.

16. The system of claim 15, in which said predetermined temperature value corresponds substantially to the maximum temperature which said current control means would attain under a normal range of operating conditions.

References Cited

UNITED STATES PATENTS

| 2,087,024 | 7/1937 | Dezotell | 337—343 |
| 2,448,289 | 8/1948 | Anderson | 337—103 |
| 2,496,135 | 1/1950 | Sedwitz | 337—102 |
| 2,949,519 | 8/1960 | Armstrong | 337—343 |
| 3,059,078 | 10/1962 | Hall | 337—107 |

BERNARD A. GILHEANY, Primary Examiner

F. E. BELL, Assistant Examiner